United States Patent [19]

Neubert et al.

[11] Patent Number: 5,529,424
[45] Date of Patent: Jun. 25, 1996

[54] DOWEL-TYPE PIN FOR CONNECTING COMPONENTS, PARTICULARLY FURNITURE PLATES

[75] Inventors: Berndt Neubert, Nagold; Ulrich Riegler, Jettingen; Georg Häsler, Nagold, all of Germany

[73] Assignee: Häfele GmbH & Co., Nagold, Germany

[21] Appl. No.: 277,254

[22] Filed: Jul. 19, 1994

[30]  Foreign Application Priority Data

Jul. 21, 1993 [DE] Germany .......................... 93 10 924.5
Jun. 17, 1994 [DE] Germany .......................... 94 09 853.0

[51] Int. Cl.⁶ .............................. F16B 7/00; F16B 13/04; B25G 3/00; F16G 11/00
[52] U.S. Cl. .................. 403/298; 403/297; 403/320; 403/409.1; 411/77; 411/78; 411/357
[58] Field of Search ................................... 403/230, 231, 403/294, 297, 298, 292, 320, 409.1; 411/78, 79, 80, 45, 48, 357, 358

[56]  References Cited

U.S. PATENT DOCUMENTS

| 100,055 | 6/1870 | Montgomery | 411/78 |
| 4,275,637 | 6/1981 | Herb et al. | 411/78 |
| 5,417,518 | 5/1995 | Bierwith | 403/298 X |

*Primary Examiner*—Kenneth J. Dorner
*Assistant Examiner*—Bruce A. Lev
*Attorney, Agent, or Firm*—Friedrich Kueffner

[57]  ABSTRACT

A dowel-type pin for connecting structural components, particularly for connecting furniture plates, is in a mounted position held over a portion of its length in a receiving opening of at least one of the plates to be connected. The pin is divided in longitudinal direction and has at least two partial pins which are displaceable relative to each other in longitudinal direction and rest against each other in the mounted position. At least one of the partial pins has an inclined abutment surface which ascends in longitudinal direction for a counter abutment surface of the respectively other partial pin.

10 Claims, 7 Drawing Sheets

DOWEL-TYPE PIN FOR CONNECTING COMPONENTS, PARTICULARLY FURNITURE PLATES

BACKGROUND OF THE INVENTION

1. Field of the Invention

The present invention relates to a dowel-type pin for connecting structural components, particularly for connecting furniture plates. In the mounted position, the pin is held over a portion of its length in a receiving opening of at least one of the plates to be connected.

2. Description of the Related Art

Pins of the above-described type are frequently used, for example, in the furniture industry as connecting elements for furniture pieces. For assembling the furniture pieces, known dowel-like pins are initially driven with one end into an appropriate receiving opening, usually a bore, of one of the furniture pieces. The second furniture piece to be connected to the first furniture piece is also provided with a receiving opening for the dowel-type pin. The free end of the pin mounted on the first furniture piece is then inserted into this receiving opening. In order to achieve this, pressure is applied to the two furniture pieces and the furniture pieces are pressed together. Because the pin has a greater dimension than the receiving openings, the pin is held in the mounted position in a clamping manner in the two furniture pieces.

The known dowel-type pins have the disadvantage that, for inserting the pins in the receiving openings of the furniture pieces, a high pressure must be applied for overcoming the force which acts on the contact surface between the outer wall surface of the pin and the inner wall surface of the receiving opening and acts against the insertion movement of the pin. When the known pin is inserted into the receiving openings, an undesirable deformation of the inner wall surface of the receiving opening may occur. Particularly in the case of furniture pieces of chip board, this deformation may impair the clamping connection of the pin pressed into the receiving opening in the mounted position.

SUMMARY OF THE INVENTION

Therefore, it is the primary object of the present invention to provide a pin of the above-described type which is simple to mount in the respective furniture pieces and which ensures in the mounted position of the pin an intensive and secure connection of the furniture pieces.

In accordance with the present invention, the pin of the above-described type is divided in longitudinal direction and has at least two partial pins which are displaceable relative to each other in longitudinal direction and rest against each other in the mounted position. At least one of the partial pins has an inclined abutment surface which ascends in longitudinal direction for a counter abutment surface of the respectively other partial pin.

Thus, when a pin is used which is composed of two partial pins for connecting two furniture plates, each partial pin is initially premounted on one of the furniture plates. Since the cross-sectional area of a partial pin is only a portion of the cross-sectional area of the respective receiving opening, the partial pins can be inserted into the respective receiving openings with the application of very little force. Subsequently, the furniture plates with the preassembled partial pins are pressed against each other in longitudinal direction of the partial pins. This causes the partial pins to slide along each other in longitudinal direction. As soon as the partial pin inserted into the respective receiving opening reaches with its counter abutment surface the abutment surface of the other partial pin preassembled in the respectively other receiving opening, a continued displacement of the inserted partial pin has the result that the partial pin rests tightly with its outer wall surface against the corresponding portion of the inner wall surface of the receiving opening. This causes the two partial pins to be tightened relative to each other in the receiving opening and to be secured in a clamping manner. Accordingly, the pin according to the present invention can be anchored in the above-described manner permanently and securely in the respective receiving opening with the application of little force and, if at all, the application of only a slight stress on the inner wall surface of the receiving opening.

In accordance with a preferred feature of the pin according to the present invention, outwardly projecting abutments are integrally formed on the side of each partial pin facing away from the abutment surface and/or the counter abutment surface. In the final mounted position, the partial pins are tightly clawed with the abutments in the inner wall surface of the receiving opening. Particularly in the case of chip board, this results in a positive locking engagement between the outer wall surface of the pin and the inner wall surface of the receiving opening which improves the holding force of the pin in the receiving opening.

In accordance with another advantageous feature of the present invention which facilitates an additional simplification of the assembly, the partial pins are connected in the initial position thereof so as to partially overlap in longitudinal direction by means of a connection which can be sheared off by the displacement movement of the partial pins. Such a pin forms a structural unit composed of temporarily connected partial pins. This structural unit can be inserted with the end of one partial pin into the corresponding receiving opening of one furniture plate. The free end of the second partial pin is inserted into the receiving opening of a second furniture plate. Subsequently, the two furniture plates are pressed together in longitudinal direction of the pin. The resulting relative displacement of the partial pins causes the temporary connection between the partial pins to be sheared off before the partial pins are wedged relative to each other in the mounted final position in the interior of the receiving openings. The described method of assembly can be carried out advantageously by means of conventional automatic assembly machines for wood dowels and plastic dowels.

Particularly if the pin according to the present invention is of plastics material, an advantageous feature provides that the partial pins are connected to each other through at least one shearing foil. When the pin is manufactured by the injection molding method, the partial pins can be manufactured in one work step together with the shearing foil which connects the partial pins and is constructed as a plastic film.

If the partial pins are connected to each other in an articulated manner through the shearing foil, they can be folded together after the manufacture thereof into a dowel-like pin. The shearing foil acts as a hinge which makes it possible that the partial pins can be pivoted relative to each other.

In accordance with another advantageous feature of the pin according to the present invention, the partial pins can be locked relative to each other in the initial position by means of at least one shearing bolt which can be sheared off by the displacement movement of the partial pins. By locking the partial pins relative to each other, the partial pins can be fixed relative to each other in a defined manner. Consequently, the ends of the partial pins to be inserted into the receiving openings of the respective furniture plates also assume a defined position. This facilitates especially the assembly of furniture plates by machines.

Generally, for meeting the object of the present invention, it is sufficient if the pin according to the present invention is composed of two partial pins. However, it may also be useful to divide the pin into more than two partial pins.

In accordance with a preferred feature of the pin according to the present invention, the pin has two partial pins in the form of wedge-shaped pin halves which can be displaced relative to each other on the wedge surfaces thereof in longitudinal direction of the pin halves. A pin of this type ensures that the two partial pins are supported relative to each other over a large surface area.

Ribs having an essentially saw tooth-like cross section may be provided on the wedge surfaces one behind the other in longitudinal direction of the partial pins and extending transversely of the displacement direction of the partial pins. The ribs prevent an unintentional listening of the effected wedge-type connection. The flat flanks of the saw tooth-like rib profiles are directed in the direction of the relative displacement of the partial pins, so that the ribs produce only a small resistance force to the displacement of the wedge-shaped pin halves in the final mounted position.

The pin according to the present invention includes a head serving as a stop and a shaft by means of which the pin engages in the mounted position through the opening in the form of a recess in the first plate into the opening provided in the second plate and located behind the first plate. In this pin, a wedge-shaped abutment ramp is provided on the shaft end of one partial pin extending into the opening of the second plate. The wedge-shaped abutment ramp interacts with the shaft end of the other partial pin acting as a mandrel. In order to effect the desired connection, initially the first partial pin equipped with the abutment ramp is pushed into the opening of the second plate to such an extent behind the opening of the first plate that the partial pin rests with its partial head against the outer side of the first plate and its shaft end engages fully in the bore of the second plate. Subsequently, the second partial pin is inserted in the remaining portion of the opening and the bore behind the opening, so that the second partial pin not only fills out the two remaining hollow spaces, but the abutment ramp at one shaft end which reduces the hollow space in the area of the two shaft ends simultaneously effects clamping of the two shaft ends in the opening provided in the second plate. This embodiment of the pin according to the present invention also ensures a secure connection between the two plates to be connected. If the connection of the plates is to be released again, initially the partial pin acting as mandrel is to be pulled out of the opening in the second plate and out of the opening provided in the first plate. Subsequently, the other partial pin can be pulled out and the previously existing connection is released.

In order to ensure that the two partial pins are securely supported at the outer side of one plate, the partial pins advantageously have partial heads which extend over an angle portion thereof and together cover an angle range of 360°.

In order to facilitate removal of the partial pin acting as mandrel, the partial head of the partial pin acting as mandrel facing the side of the shaft is provided with a recess for applying or engaging a tool for pulling out this partial pin.

Since the shaft end of the partial pin acting as mandrel and received in the opening of the second plate conically narrows, the insertion of this partial pin into the opening is made easier.

In order to prevent an undesired separation of the connection between the furniture plates, a projecting locking projection or the like is integrally formed on one partial pin on a side facing the other partial pin, wherein the locking projection engages in a locking position in a recess provided in the oppositely located side of the other partial pin. Such a locking connection makes it possible to prevent an undesired relative movement of the partial pins in longitudinal direction of the partial pins. In pins according to the present invention with partial pins in the form of wedge-shaped pin halves, the locking connection by means of the projection can be provided additionally to or instead of the ribs with saw tooth-like profiles extending transversely of the displacement direction of the partial pins.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 2b is a perspective view of the connecting pin according to FIG. 2a;

DETAILED DESCRIPTION OF THE PREFERRED EMBODIMENTS

Figure 1:
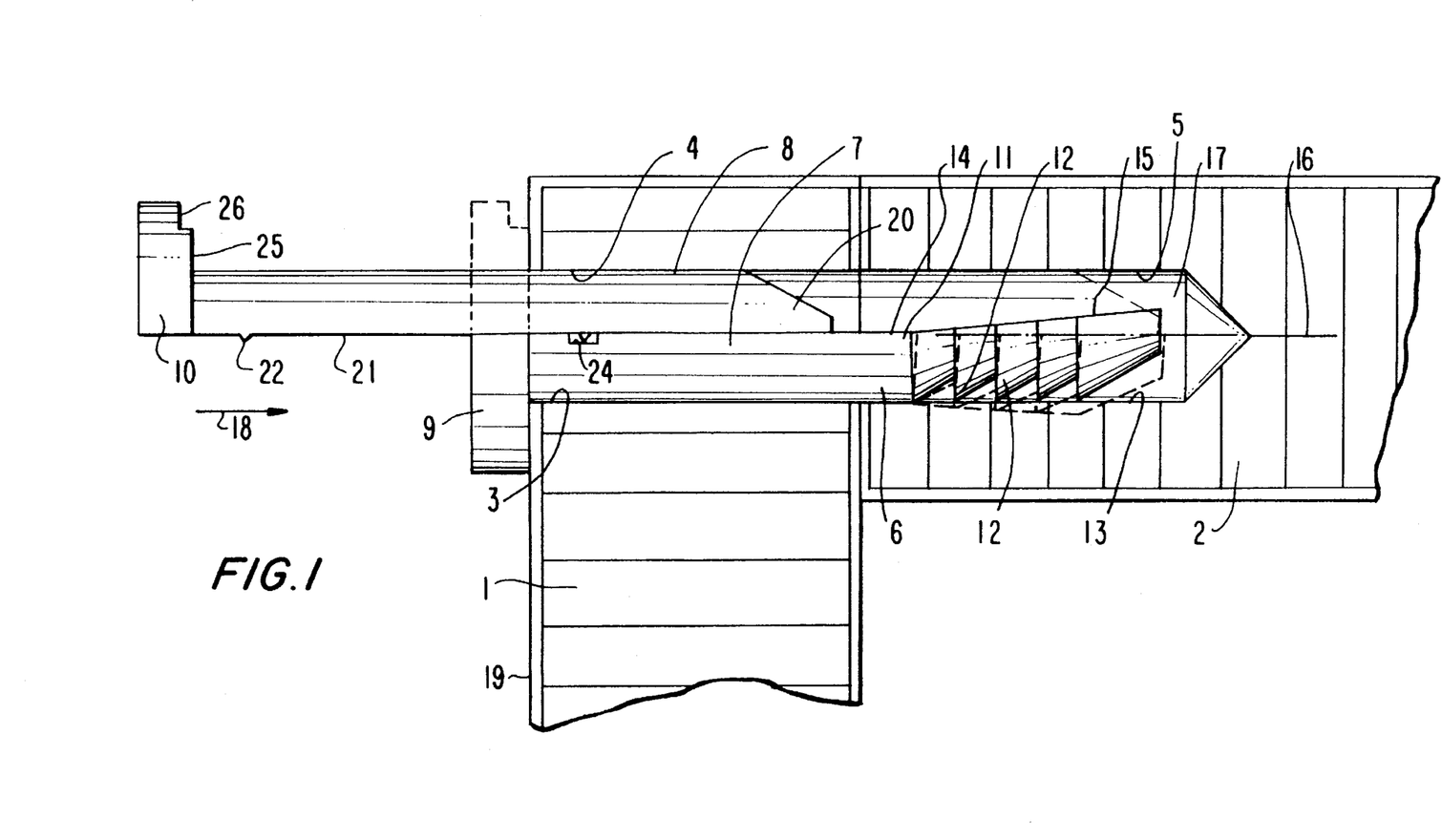
FIG. 1 is an elevational view of a dowel-like connecting pin according to the present invention with a mandrel-like partial pin.

FIG. 1 of the drawing shows two furniture plates 1 and 2 with a continuous opening 3, wherein in plate 1 the opening is a receiving opening 4 which may have any cross section and is constructed similar to a bore. In the other plate 2, on the other hand, the opening is a bore 5 in the form of a recess. The two plates 1 and 2 are connected by means of a dowel-like pin in the form of a connecting pin 6. In the locked position, the connecting pin extends through the opening 4 and engages fully in the bore 5.

The connecting pin 6 is longitudinally divided in axial direction and is composed of the two partial pins 7 and 8 each of which extends over a range of 180° and each has a partial head 9 or 10, respectively, extending over the same angle range.

As illustrated in the drawing, the lower partial pin 7 has at its shaft end 11 a plurality of claws 12 as abutments which are located opposite the inner wall surface 13 of the bore 5. In addition, on the side 14 of the shaft end 11 facing away from the claws 12, an inclined abutment surface in the form of an abutment ramp 15 is provided which projects beyond the middle axis 16 and into the partial space 17.

If this pin 6 is now to be used for effecting the desired connection between the two plates 1 and 2, initially the partial pin 7 is to be inserted into the common opening 3 in the direction of arrow 18 until the partial pin 7 makes contact with the partial head 9 thereof against the outer side 19 of the first plate 1 and its shaft end 11 extends fully into the bore 5 of the other plate 2. Subsequently, the other partial pin 8 acting as a mandrel is also inserted into the opening 3, wherein, in the locked position illustrated in broken lines, the shaft end 20 of the partial pin 8 runs up onto the abutment ramp 15 of the other partial pin 7 and the shaft end 11 of this partial pin 7 is pressed against the inner wall surface 13 of the bore 5, so that the claws 12 provided at this shaft end 11 are hooked into the inner wall surface 13 of the bore 5 in the manner also shown in broken lines. Since the shaft end 20 of the second partial pin 8 fully fills out the bore 5, the shaft end 11 with the claws 12 of the other partial pin 7 cannot yield, so that a separation of the claws 12 out of the inner wall surface 13 of the bore 5 is impossible.

In order to prevent an undesirable release of the partial pin 8, the partial pin 8 has on its inner side 21 facing the partial pin 7 a locking projection 22 which, in the inserted locking position of this partial pin 8, engages in a recess 24 provided in the oppositely located inner side of the partial pin 7, so that an undesirable displacement of the partial pin 8 acting as a mandrel relative to the other partial pin 7 is prevented.

When the connection of the two plates 1 and 2 effected by the connecting pin 6 is to be released, initially the partial pin 8 acting as mandrel is to be pulled out of the opening 3 in a direction opposite the direction of arrow 18. In order to be able to use a suitable tool for this purpose, the partial head 10 of the partial pin 8 has a recess 26 on the inner side 25 facing the plate 1, wherein the claw of a suitable tool can be inserted into the recess 26, the partial head 10 of the partial pin 8 can be engaged and the partial pin 8 can be pulled out of the bore 3. Once this has been done, the other partial pin 7 can also be easily pulled out of the bore 5, since the claws 12 provided on the shaft end 11 are moved away from the inner wall 13 and, thus, release the partial pin 7.

Figure 2A:
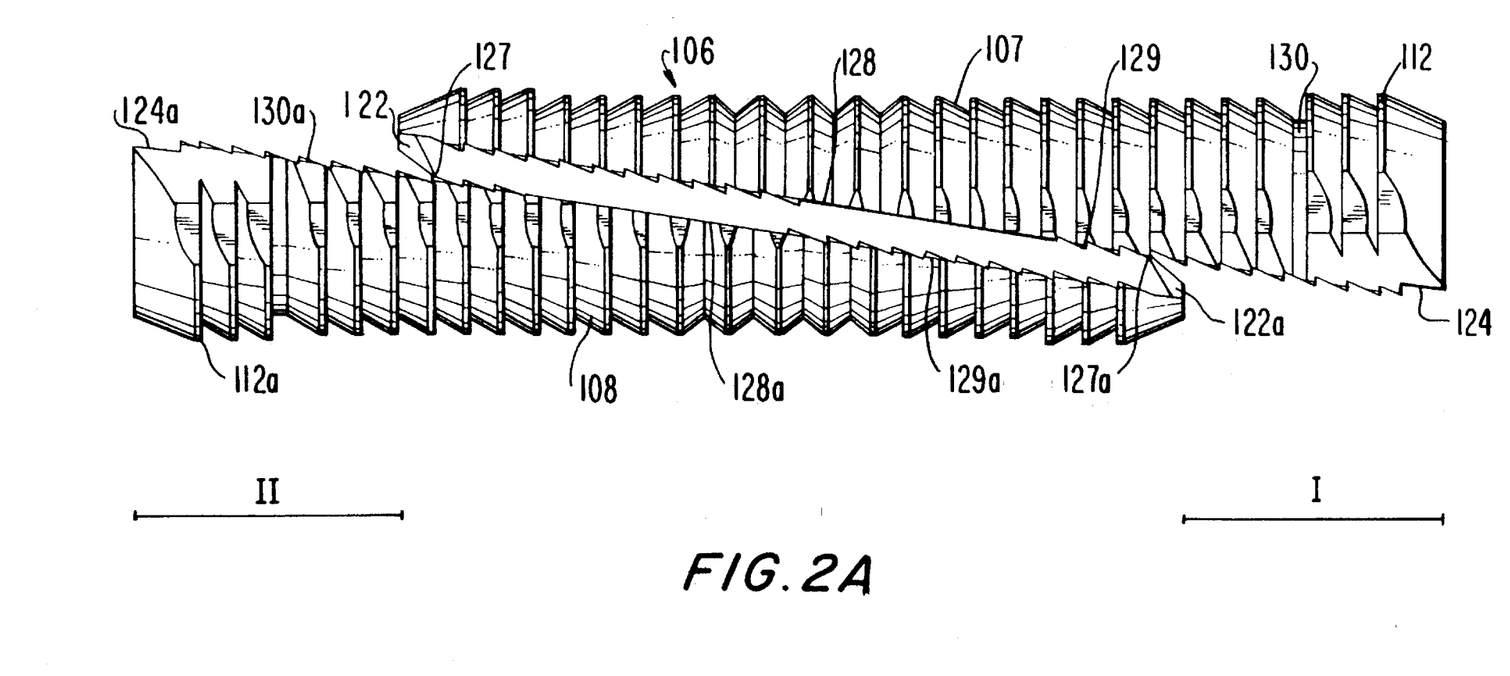
FIG. 2a is a side view of a first embodiment of a dowel-like connecting pin composed of two wedge-shaped partial pins in initial mounting position.
Figure 2B:
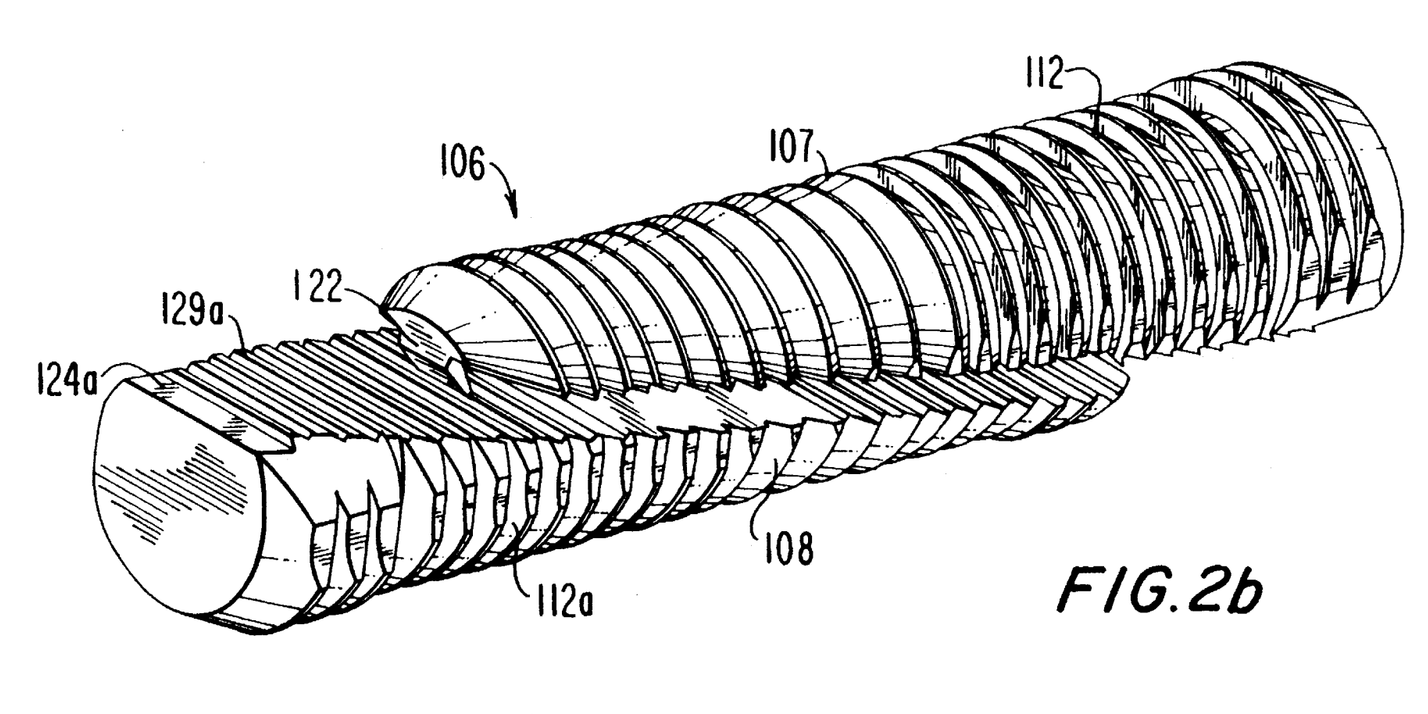

The dowel-like pin according to the present invention shown in FIGS. 2a and 2b is a connecting pin 106 which is composed of two partial pins in the form of wedge-shaped pins halves 107, 108. The wedge-shaped pins halves 107, 108 are plastics material components which are manufactured by injection molding. Injection molded to each wedge-shaped pin half 107, 108 is a locking projection 122, 122a, respectively, which is connected to the respectively opposite pin half through a connection which can be sheared off and is also manufactured during the injection molding process; the connection is a shearing foil in the form of a yield skin 127, 127a. Recesses 124, 124a are formed in the ends of the wedge-shaped pin halves 107, 108 located opposite the locking projections 122, 122a. Wedge surfaces 128, 128a which serve as inclined abutment surfaces or counter surfaces and face each other are provided with ribs 129, 129a which extend in transverse direction of the wedge-shaped pin halves 107, 108 and are saw tooth-shaped in cross section. On their outer circumferences, the wedge-shaped pin halves 107, 108 have abutments in the form of claws 112, 112a.

When two furniture components to be connected, for example, furniture plates, are to be assembled, the wedge-shaped pin halves 107, 108 are initially inserted along end portions I, II into oppositely located receiving openings of the furniture plates. Since the maximum cross-sectional areas of the end portions I, II of the wedge-shaped pin halves 107, 108 are merely a portion of the cross-sectional area of the corresponding receiving openings, only a small insertion force is required for inserting the pin halves. Subsequently, the two furniture plates with the preassembled wedge shaped pin halves 107, 108 are pressed against each other. This causes the wedge-shaped pin halves 107, 108 to be initially displaced relative to each other and parallel to each other until the wedge surfaces 128, 128a rest against each other. The yield skins 127, 127a serve as a hinge about which the locking projections 122, 122a perform a pivoting movement. As a result of continued pressure applied to the two furniture plates to be connected to each other, the shearing foils 127, 120a are sheared off and the wedge-shaped pin halves 107, 108 slide along each other and their wedge surfaces 128, 128a until they completely cover each other. In the final mounting position which has now been reached, the two wedge-shaped pin halves 107, 108 are clamped relative to each other in the receiving openings of the furniture plates. Because of the excess dimension of the connecting pin 106 composed of the wedge-shaped pin halves 107, 108 are compared to the cross-sectional sides of the receiving openings, the connecting pin 106 is securely held in the receiving openings in the final mounted position of the connecting pin 106. When the final mounted position is reached, the locking projection 122 provided on the wedge-shaped pin half 107 engages the recess 124a provided in the wedge-shaped pin half 108. A corresponding locking engagement is achieved between the locking projection 122a on the wedge-shaped pin half 108 and the recess 124 in the wedge shaped pin half 107. The resulting locking connections prevent a relative displacement of the wedge-shaped pin halves 107, 108 in a direction opposite the mounting movement and secure the connection between the furniture plates in this manner. The connection is additionally secured by the saw tooth-shaped ribs 129, 129a on the wedge surfaces 128, 128a which engage in each other in the final mounted position of the wedge-shaped pin halves 107, 108. The saw tooth-shaped ribs 129, 129a effect a positively locking engagement between the wedge-shaped pin halves 107, 108.

Particularly in the case of furniture components of chip board, a positively locking engagement between the outer surface of the connecting pin 106 and the inner wall surfaces of the receiving openings of the furniture components is achieved by means of the claws 112, 112a which during tightening of the two wedge-shaped pin halves 107, 108 relative to each other penetrate into the inner wall surfaces of the receiving openings in the furniture plates and, thus, counteract an axial separation of the connection between the furniture plates. In order to prevent expansion of chip boards during tightening of the wedge-shaped pin halves 107, 108, circumferential grooves 130, 130a having a relatively large cross-sectional area are provided at the end portions I, II of the pin halves 107, 108, wherein displaced chip board material can be deposited in the circumferential grooves 130, 130a. An undesired expansion of the entry edges of the receiving openings provided in the furniture plates is additionally avoided by providing the connecting pin 106 composed of the wedge-shaped pin halves 107, 108 in the final mounted position in the areas of the entry edges with a slightly greater dimension as compared to the cross-sectional area of the receiving openings in the interior of the receiving openings.

Figure 3A:
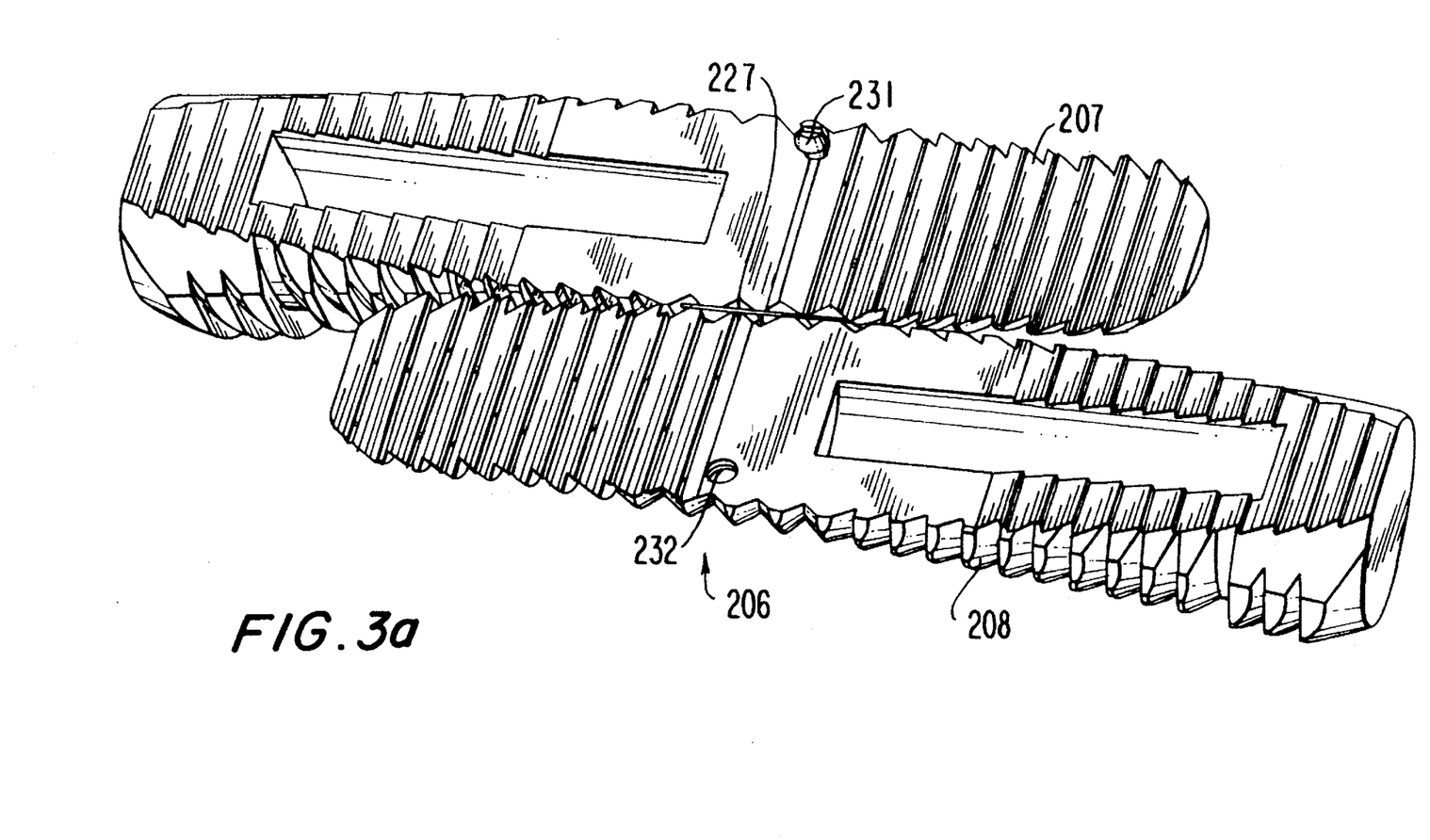
FIG. 3a is a perspective view of a second embodiment of a dowel-like connecting pin composed of two wedge-shaped partial pins.
Figure 3B:
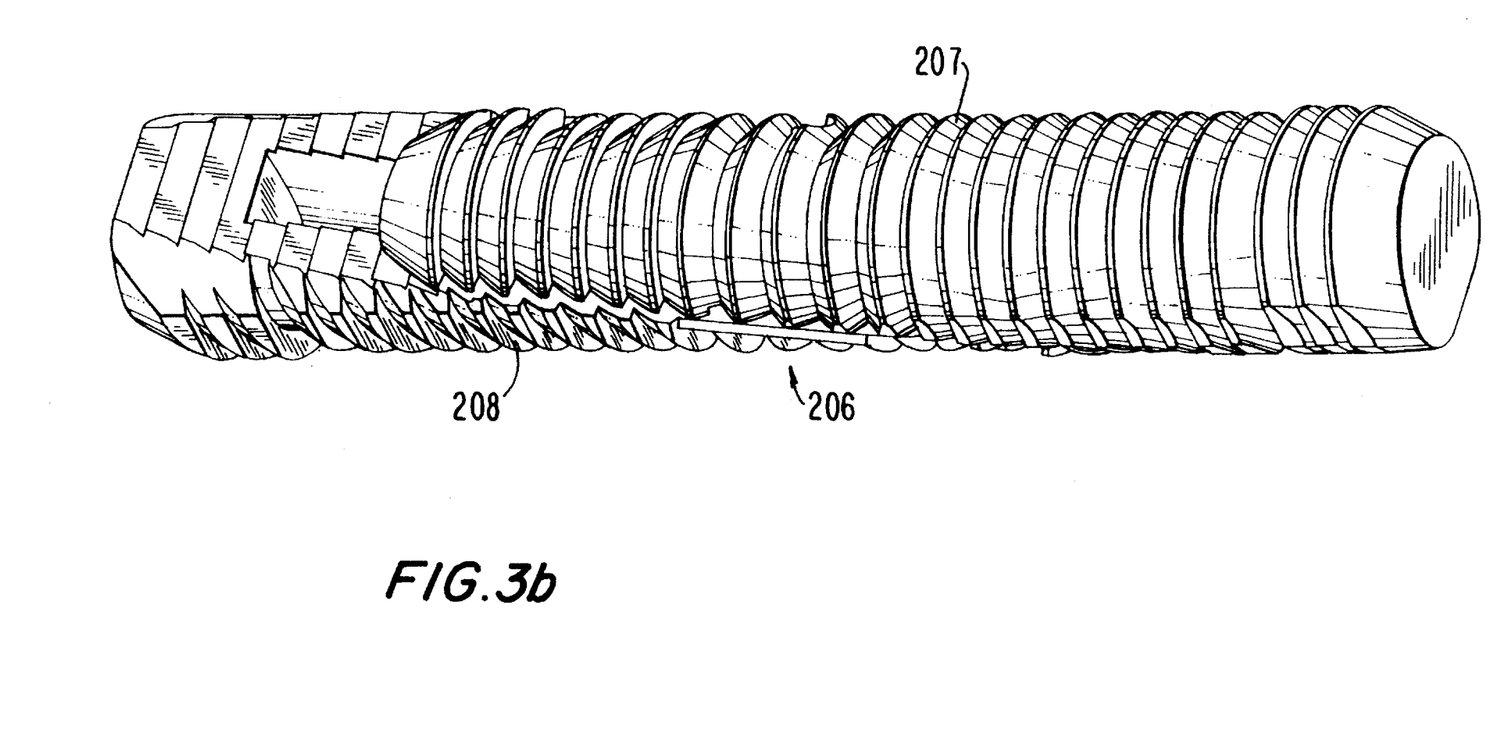
FIG. 3b is another perspective view showing the connecting pin of FIG. 3a in the initial mounting position.

The dowel-like pin in the form of a connecting pin 206 as illustrated in FIGS. 3a and 3b corresponds in its construction as well as in its manner of operation essentially to the connecting pin 106 according to FIGS. 2a and 2b. The embodiment according to FIGS. 3a and 3b differs from the one according to FIGS. 2a and 2b in that the connecting pin 206 has as the connection between the wedge-shaped pin halves 207, 208 which can be sheared off a shearing foil extending in longitudinal direction in the form of an axial yield skin 227 and a shearing bolt 231 as an additional connecting element. The shearing bolt 231 injection molded to the wedge-shaped pin half 207 interacts with a locking opening 232 provided in the other wedge-shaped pin half 208. When preparing for the assembly, the two wedge-shaped pin halves 207, 208 are folded together about the axial yield skin 227 which acts as a hinge and are locked relative to each other by pressing the shearing bolt 231 into the locking opening 232. As a result of this locking connection, the wedge-shaped pin halves 207, 208 are held in a defined position relative to each other in the initial mounting position.

Figure 4A:
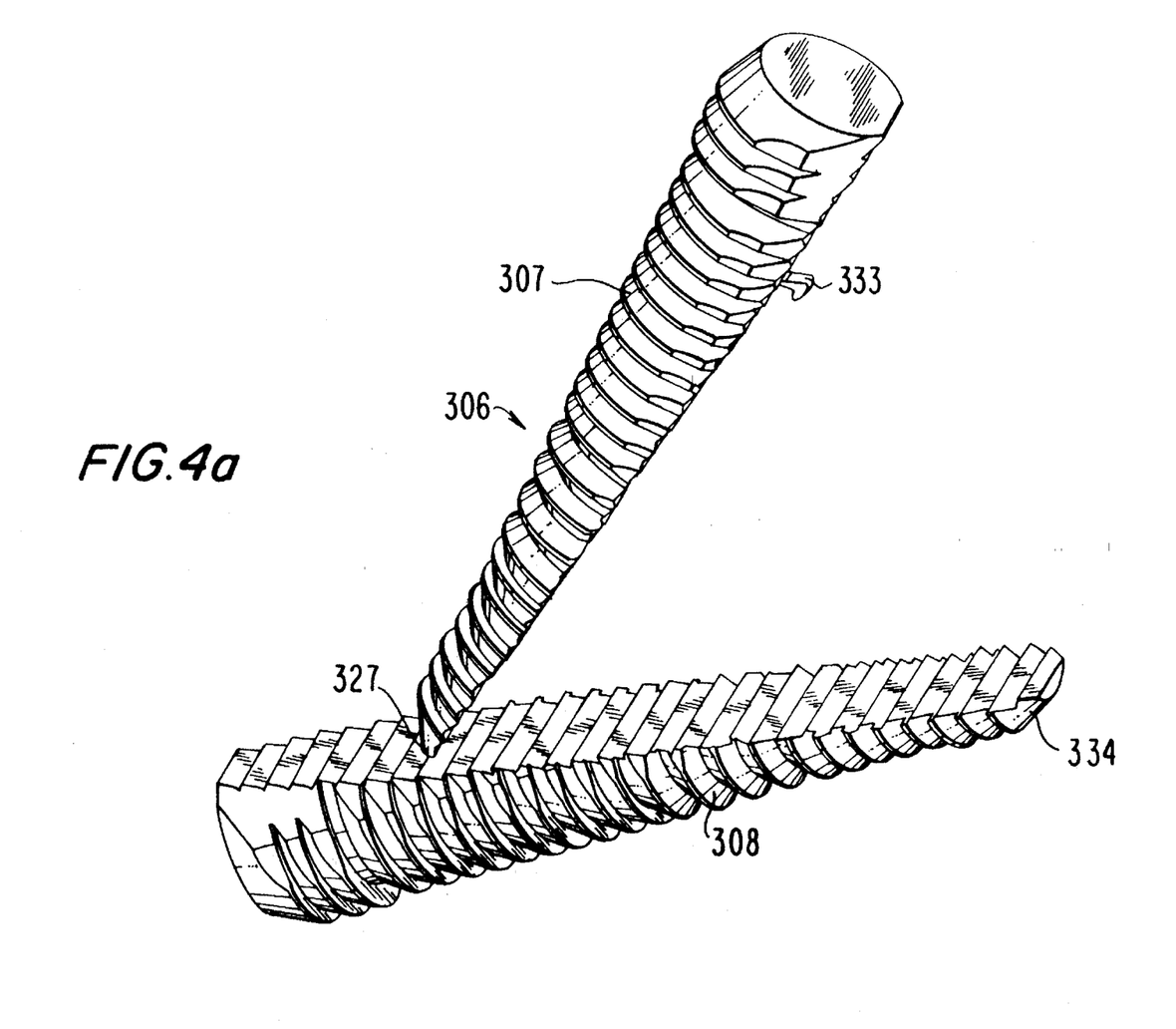
FIG. 4a is a perspective view of a third embodiment of the dowel-like connecting pin composed of two wedge-shaped partial pins.
Figure 4B:
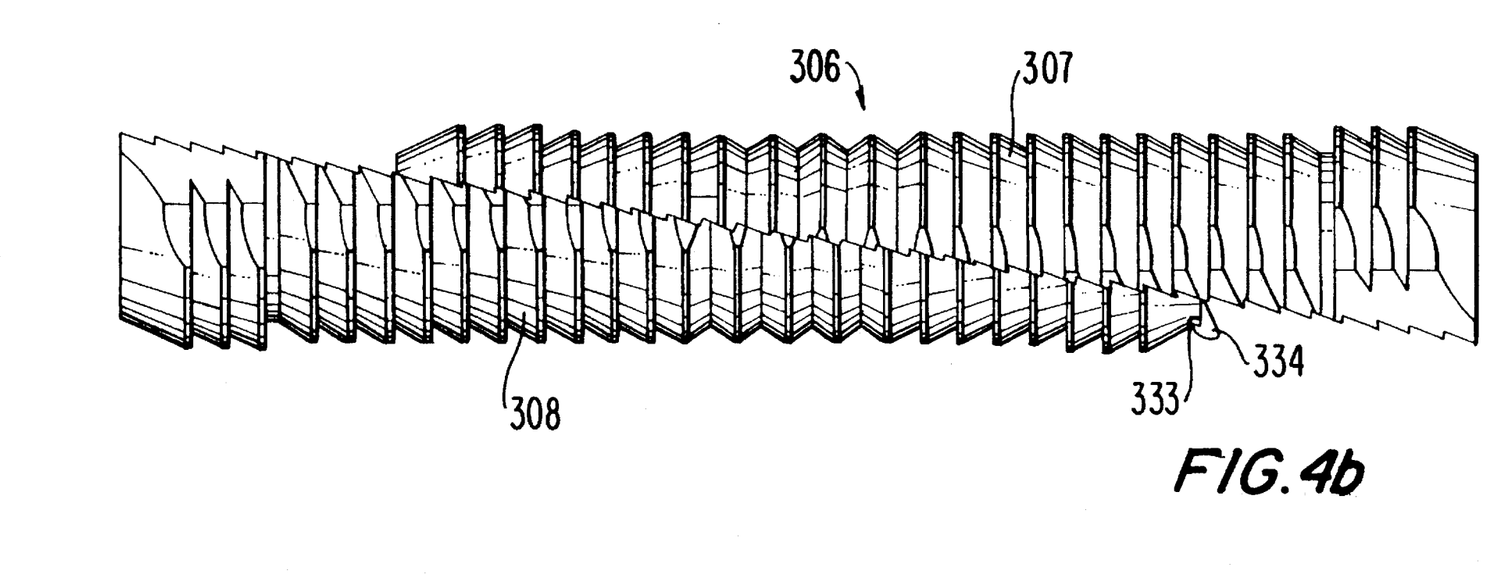
FIG. 4b is a side view of the connecting pin of FIG. 4a in initial mounting position.

As shown in FIGS. 4a and 4b, the dowel-like pin is a connecting pin 306 of plastics material which is composed of the wedge-shaped pin halves 307, 308. The connection between the wedge shaped pin halves 307, 308 which can be sheared off is a shearing foil in the form of a yield skin 327 extending in the transverse direction of the pin halves 307, 308. In addition, for the initial connection of the wedge shaped pin halves 307, 308 in the initial mounting position, a locking hook 333 is injection molded on the wedge-shaped pin half 307, wherein the locking hook 333 engages a locking projection 334 on the other wedge-shaped pin half 308. When the wedge-shaped pin halves 307, 308 are displaced relative to each other into the final mounted position, the locking hook 333 as well as the yield skin 327 are sheared off.

Figure 5:
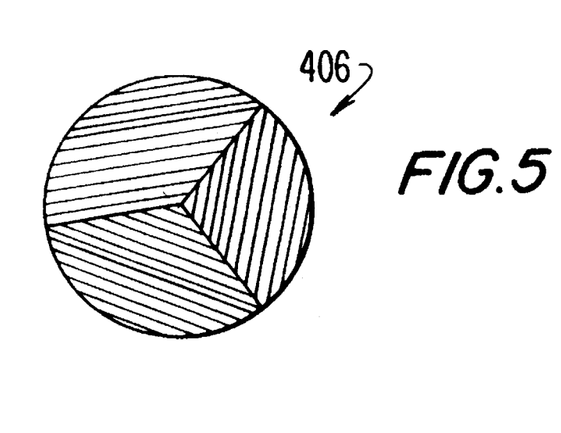
FIG. 5 is a transverse cross-sectional view of a dowel-like pin having three partial pins.

FIG. 5 shows a transverse cross-sectional view of a dowel-like pin 406 which has three partial pins.

The invention is not limited by the embodiments described above which are presented as examples only but can be modified in various ways within the scope of protection defined by the appended patent claims.

We claim:

1. A dowel-like pin type for connecting structural components, wherein the pin is in a mounted position thereof held over a portion of its length in a receiving opening of at least one of the structural components to be connected, the pin having a longitudinal direction, the pin being divided in longitudinal direction into partial pins, the partial pins being displaceable relative to each other in longitudinal direction, wherein a first of the partial pins has an inclined abutment surface which ascends in longitudinal direction and a second of the partial pins has an inclined counter abutment surface, wherein the inclined abutment surface of the first partial pin and the inclined counter abutment surface of the second partial pin rest against each other in the mounted position of the pin, further comprising at least one connection between the first partial pin and the second partial pin, the at least one connection comprising a shearing foil and connecting the partial pins in an initial position such that the partial pins partially overlap in longitudinal direction, wherein the at least one connection can be sheared off by a displacement movement of the partial pins.

2. The dowel-like pin according to claim 1, wherein at least one of the first partial pin and the second partial pin comprises radially outwardly projecting abutments on a side facing away from the inclined abutment surface and the inclined counter abutment surface.

3. The dowel-like pin according to claim 1, comprising more than two partial pins.

4. The dowel-like pin according to claim 1, wherein the two partial pins are wedge-shaped pins having wedge surfaces, the pin halves being displaceable relative to each other in longitudinal direction.

5. The dowel-like pin according to claim 4, comprising ribs having an essentially saw tooth-like cross-section, the ribs being arranged on the wedge surfaces one behind the other in longitudinal direction and extending transversely of the displacement direction of the partial pins.

6. The dowel-like pin according to claim 1, wherein the first partial pin has a locking projection on a side facing the second partial pin, the second partial pin having a recess on a side facing the first partial pin, the locking projection engaging in the recess in a locking position of the pin.

7. A dowel-like pin type for connecting structural components, wherein the pin is in a mounted position thereof held over a portion of its length in a receiving opening of at least one of the structural components to be connected, the pin having a longitudinal direction, the pin being divided in longitudinal direction into partial pins, the partial pins being displaceable relative to each other in longitudinal direction, wherein a first of the partial pins has an inclined abutment surface which ascends in longitudinal direction and a second of the partial pins has an inclined counter abutment surface, wherein the inclined abutment surface of the first partial pin and the inclined counter abutment surface of the second partial pin rest against each other in the mounted position of the pin, comprising at least one locking connection for locking the partial pins together in an initial position thereof, and wherein the locking connection is a bolt which can be sheared off by a displacement movement of the partial pins.

8. A dowel-like pin type for connecting structural components, wherein the pin is in a mounted position thereof held over a portion of its length in a receiving opening of at least one of the structural components to be connected, the pin having a longitudinal direction, the pin being divided in longitudinal direction into partial pins, the partial pins being displaceable relative to each other in longitudinal direction, wherein a first of the partial pins has an inclined abutment surface which ascends in longitudinal direction and a second of the partial pins has an inclined counter abutment surface, wherein the inclined abutment surface of the first partial pin and the inclined counter abutment surface of the second partial pin rest against each other in the mounted position of the pin, comprising a head serving as a stop and a shaft for engaging the pin in the mounted position thereof through the receiving opening in a first of the structural components and into the receiving opening in a second of the structural components and located behind the first structural component, the shaft having a shaft end extending into the second structural component, the first partial pin having a wedge-shaped abutment ramp at the shaft end, the abutment ramp complementing the shaft end of the second partial pin, wherein each of the partial pins comprises a partial head, the partial heads together extending over an angle range of 360°, and wherein the second partial pin comprises a recess on a side of the partial head thereof facing the shaft, the recess being adapted for engagement by a tool for pulling out the second partial pin.

9. A dowel-like pin type for connecting structural components, wherein the pin is in a mounted position thereof held over a portion of its length in a receiving opening of at least one of the structural components to be connected, the pin having a longitudinal direction, the pin being divided in longitudinal direction into partial pins, the partial pins being displaceable relative to each other in longitudinal direction, wherein a first of the partial pins has an inclined abutment surface which ascends in longitudinal direction and a second of the partial pins has an inclined counter abutment surface, wherein the inclined abutment surface of the first partial pin and the inclined counter abutment surface of the second partial pin rest against each other in the mounted position of the pin, comprising a head serving as a stop and a shaft for engaging the pin in the mounted position thereof through the receiving opening in a first of the structural components and into the receiving opening in a second of the structural components and located behind the first structural component, the shaft having a shaft end extending into the second structural component, the first partial pin having a wedge-shaped abutment ramp at the shaft end, the abutment ramp complementing the shaft end of the second partial pin, wherein each of the partial pins comprises a partial head, the partial heads together extending over an angle range of 360°, and wherein the second partial pin comprises a recess on a side of the partial head thereof facing the shaft, the recess being adapted for engagement by a tool for pulling out the second partial pin, wherein the shaft end of the second partial pin has a conically narrowing shape at the receiving opening of the second structural component.

10. A dowel-like pin for connecting structural components, wherein the pin is in a mounted position thereof held over a portion of its length in a receiving opening of at least one of the structural components to be connected, the pin having a longitudinal direction, the pin being divided in longitudinal direction into partial pins, the partial pins being displaceable relative to each other in longitudinal direction, wherein a first of the partial pins has an inclined abutment surface which ascends in longitudinal direction and a second of the partial pins has an inclined counter abutment surface, wherein the inclined abutment surface of the first partial pin and the inclined counter abutment surface of the second partial pin rest against each other in the mounted position of the pin, further comprising at least one connection between the first partial pin and the second partial pin, the at least one connection comprising a shearing foil and connecting in an articulated manner the partial pins in an initial position such that the partial pins partially overlap in longitudinal direction, wherein the at least one connection can be sheared off by a displacement movement of the partial pins.

* * * * *